United States Patent [19]
Adachi

[11] 3,878,926
[45] Apr. 22, 1975

[54] CLUTCH AND BRAKE WITH RESILIENT OPERATOR

[75] Inventor: Kazuma Adachi, Yao, Japan

[73] Assignee: Kabushiki Kaisha Daikin Seisakusho, Neyagawa, Japan

[22] Filed: Mar. 27, 1973

[21] Appl. No.: 345,335

[30] Foreign Application Priority Data
  Mar. 30, 1972 Japan............................. 47-32398
  Mar. 29, 1972 Japan............................. 47-31395

[52] U.S. Cl............... 192/18 R; 192/109 A; 74/470
[51] Int. Cl............................................ F16d 67/02
[58] Field of Search.......... 192/109 A, 18 R; 74/470

[56] References Cited
UNITED STATES PATENTS

| | | | |
|---|---|---|---|
| 486,687 | 11/1892 | Swarthout.......................... | 74/470 X |
| 1,382,133 | 6/1921 | Walker et al. ..................... | 192/18 R |
| 1,404,984 | 1/1922 | Lower................................. | 74/470 |
| 3,557,919 | 1/1971 | Speich ............................ | 192/109 A |
| 3,702,648 | 11/1972 | Mori.................................. | 192/4 C |

FOREIGN PATENTS OR APPLICATIONS

| | | | |
|---|---|---|---|
| 1,000,766 | 10/1951 | France............................. | 192/18 R |
| 230,424 | 1/1911 | Germany............................. | 74/470 |

Primary Examiner—Benjamin W. Wyche
Attorney, Agent, or Firm—Depaoli & O'Brien

[57] ABSTRACT

An apparatus comprising a clutch element disposed between a power transmitting member and a brake member and supported on a driven shaft so as to be movable only axially thereof, and an operation lever for moving the element in the axial direction. The clutch element is connected to the operation lever under the elastic action of a spring member and is so biased as to be shiftable toward the brake member all the time, to absorb impact and vibration when the clutch element is engaged and disengaged. The apparatus may further include a friction damper for giving frictional resistance to the engaging and disengaging movement of the clutch element.

1 Claim, 16 Drawing Figures

CLUTCH AND BRAKE WITH RESILIENT OPERATOR

BACKGROUND OF THE INVENTION

The present invention relates to an apparatus for operating a clutch, more particularly to an apparatus for engaging and disengaging a friction clutch by a lever which clutch is provided in the power transmission effecting and interrupting portion of working machines to be operated by a relatively small power.

In using such clutch assembly to operate or stop machines, the torque of drive means acts abruptly on driven means or the torque of the driven means due to its inertia suddenly acts on the brake means when the friction member of the driven means comes into contact with the friction surface of the drive means or with the friction surface of the brake means, with the result that an intense impact acts on the clutch assembly, giving rise to accidents such as breakage of the operation lever, friction members and the like. Moreover, due to the great difference in revolution number between the contact members, it is very difficult to effect smooth contact, and vibration and noise will result at the initial stage of contact. However, since no special apparatus is avaialbe for eliminating such objections, it is practiced to control the manipulation of the lever in initiating and stopping the operation to prevent vibration and noise. Thus the clutch assembly requires a skilled operator.

SUMMARY OF THE INVENTION

An object of this invention is to provide an apparatus for operating a clutch assembly of the type described which does not require any skill for the operation of a lever to engage and disengage a clutch element therein and which is free of vibration and noise when operated to drive or stop the machine for which it is provided.

Another object of this invention is to reduce and absorb impact during the clutch engaging and disengaging operation and to thereby prevent accidents such as breakage of the lever and damage to the friction surfaces.

According to this invention there is provided a clutch assembly comprising a power transmitting member on a drive shaft, a stationary brake member spaced apart from the power transmitting member by a distance, and a clutch element disposed between the transmitting member and the brake member and supported on a driven shaft so as to be movable only in the axial direction thereof. The clutch element is provided on the opposite sides along its outer periphery with friction surfaces in facing relation to the friction surface of the power transmitting member and the friction surface of the brake member respectively. When one of the friction surfaces of the clutch element is pressed against the friction surface of the power transmitting member, the clutch element transmits the torque of the drive shaft to the driven shaft, causing the driven shaft to rotate with the drive shaft, whereas when the other friction surface is pressed against the brake member, the driven shaft is stopped from rotation. The pressing movement is effected by shifting the clutch element on the driven shaft in its axial direction.

The operation means for slidingly moving the clutch element on the driven shaft in the axial direction comprises an operation lever pivotably supported on a frame, a spring member interposed between the lever and the clutch element to cause the clutch element to follow the operation of the lever in elastic manner and biasing means for urging the clutch element toward the brake member all the time.

The spring member comprises superposed plate springs directly or indirectly connecting the operation lever to the clutch element so as to permit the clutch element to follow the operation of the lever in elastic fashion. Alternatively, the spring memeber may comprise a compression spring, pulling spring or the like disposed at the portion connecting the operation lever to the clutch element to impart elasticity to the movement of the clutch member caused by the operation of the lever.

Accordingly, the spring member prevents impactive engagement and disengagement of the clutch element.

The present invention further provides means for giving frictional resistance to the clutch engaging and disengaging movement. The frictional resistance is given by friction damper means provided in the support portion for the operation lever or between the operation lever and the clutch element. The frictional resistance further mitigates the aforementioned impactive engagement and disengagement to eliminate possible breakage of the lever and damage to the frictional members.

Other objects and features of this invention will become more apparent from the description of embodiments of this invention.

DESCRIPTION OF THE PREFERRED EMBODIMENTS

With reference to FIGS. 1 to 4, a drive shaft 1 supported by a bearing 18 on a frame 20 is driven by an unillustrated prime mover or electric motor and fixedly carries at its end a flywheel 2 serving as a power transmitting member and having a friction surface 2a. A brake member 3 fixedly and independently mounted on the frame 20 has a friction surface 3a spaced apart by a suitable distance from the friction surface 2a of the flywheel 2 in opposing relation thereto. A clutch element 4 interposed between the friction surfaces 2a and 3a is provided, on the opposite side faces at its outer periphery, with friction surfaces 4a and 4b facing the friction surfaces 2a and 3a respectively. The clutch element 4 is axially movable within the range defined by the friction surfaces 2a and 3a. At one extremity of its movement, the torque of the drive shaft 1 is delivered to the clutch element 4 by the contact of the friction surface 4a with the friction surface 2 a, and at the other extremity of its movement, the element is stopped against rotation through the contact of the friction surface 4b with the friction surface 3a.

The clutch element 4 has a spline boss 4c extending sidewise from its inner periphery in one direction and slidingly fitted around a splined end 5a of a driven shaft 5, whereby the torque is delivered to the driven shaft 5 to rotate a device to be driven. The driven shaft 5 is supported by a bearing 19 on the frame 20.

The clutch element 4 is shifted axially by pivotally moving an operation lever 6, which is pivotably supported on a pin 7 at the upper end of a support member 21 fixedly mounted on the frame 20. A spring member 8 connects the operation lever 6 to the spline boss 4c of the clutch element 4. The spring member 8 comprises an assembly of superposed plate springs 9. The plate springs 9 are so disposed as to enable the clutch element 4 to follow the movement of the operation lever 6 under the elastic action of the plate springs 9.

The operation lever 6 is connected to a free end of biasing means such as the pulling spring 16, the other end of which is fixed to the brake member 3 or some other suitable stationary member. The pulling spring 16 biases the clutch element 4 toward the brake member all the time. The spline boss 4c of the clutch element 4 is in the form of a sleeve having an axial length sufficient to prevent the shake of the boss on the driven shaft 5 which could otherwise result from the construction that the clutch element is supported at one side only.

To connect the plate spring assembly 9 to the spline boss 4c as at 10, one end of the plate spring assembly 9 secured to the distal end of the operation lever 6 by a rivet 17a is fixed, by a rivet 17b, to a yoke 11, which is engaged with a driven portion 12 formed at the end of the spline boss 4c. The driven portion 12 includes a pair of thrust bearings 13 spaced apart by a distance to form a groove 14 therebetween. Pawls 15 projecting inward from the yoke 11 engage in the groove 14.

Figure 1:
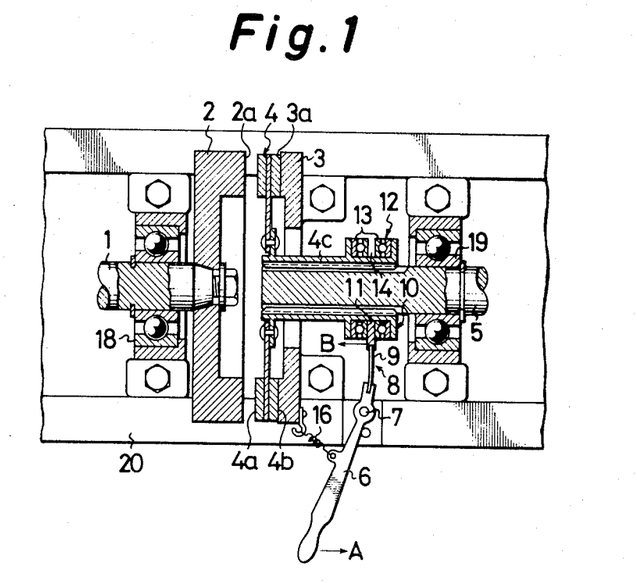
FIG. 1 is a plan view in vertical section showing the principal part of an embodiment of this invention, the view being taken along the axis of the apparatus.
Figure 2:
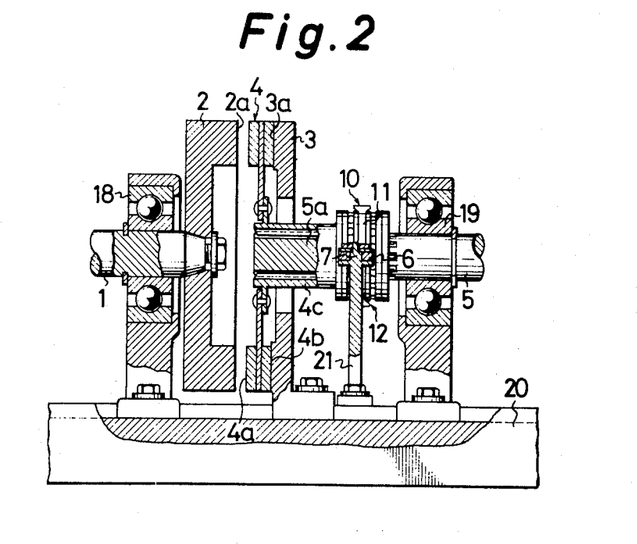
FIG. 2 is a front view in section showing the same.

Thus when pivotally moved in the direction of arrow A in FIG. 1 against the action of the spring 16, the operation lever 6 moves the clutch element 4 in the direction of arrow B through the plate spring assembly 9 and yoke 11, bringing the friction surface 4a into contact with the friction surface 2a of the flywheel 2 to deliver the torque of the drive shaft 1 to the driven shaft 5. Generally with this type of apparatuses, such contact will produce intense impact and vibration acting in the direction of rotation, inasmuch as the flywheel 2 is rotating at a given speed whereas the clutch element 4 is out of rotation. In the case of the present apparatus, however, the elasticity of the plate springs 9 mitigates impact and absorbs vibration for smooth transmission of the torque. Furthermore, during the deformation of the superposed plate springs due to the foregoing operation, friction takes place at the interfaces of the springs, and the resulting frictional force produces a damping effect to absorb the impact and vibration and to thereby effect the above-mentioned contact more smoothly.

When the operation lever 6 is relieved of the operation force acting thereon, the lever 6 returns automatically under the action of the spring 16, releasing the clutch element 4 from the friction surface 2a of the flywheel to bring the other friction surface 4b of the element 4 into contact with the friction surface 3a of the brake member 3. Although the clutch member 4 has already been freed from the torque of the drive shaft at the moment of this contact, the member 4 per se is still in rotation under the action of inertia of itself and of the driven member, whereas the brake member 3 is not in rotation. Accordingly, the superposed plate springs 9 act to absorb impact and vibration at this time as in the foregoing operation, permitting the clutch element 4 and the driven member to stop smoothly free of objectionable results.

Figure 5:
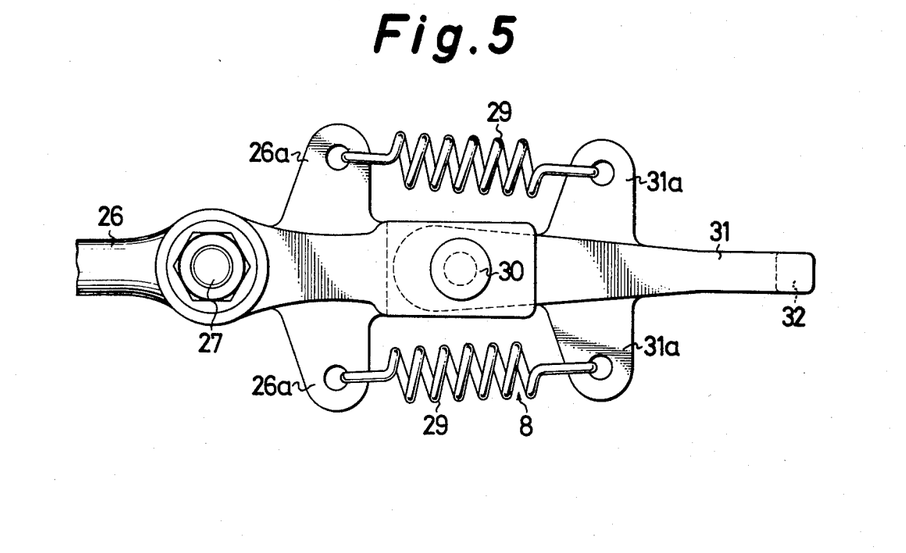
FIG. 5 is a plan view on an enlarged scale showing the principal part of another embodiment.
Figure 6:
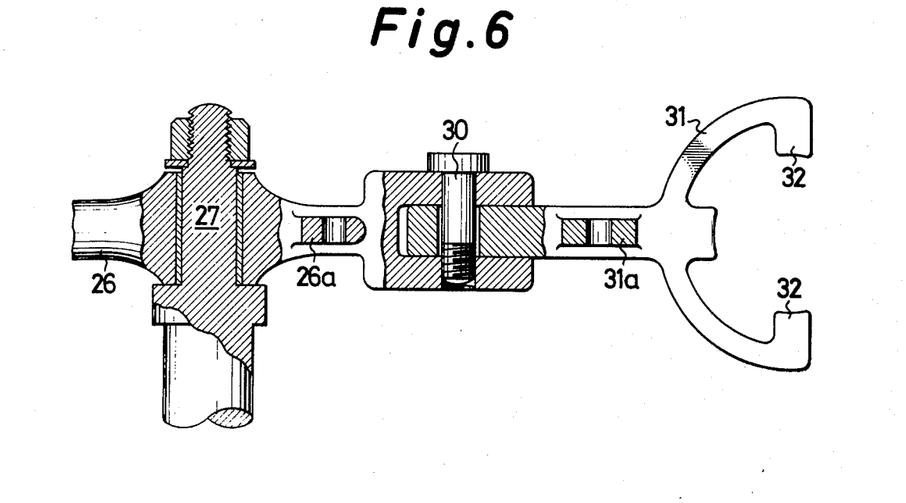
FIG. 6 is a side elevation of the same.

According to the embodiment of FIGS. 5 and 6, a pair of pulling springs 29 is used for the spring member 8 in place of the superposed plate springs 9, the construction being such that the active forces of the pulling springs 29 in balance keep a yoke 31 in definite position, causing the yoke 31 to follow the movement of an operation lever 26 under the action of the springs 29.

More specifically, the base portion of the yoke 31 is pivoted as at 30 to the distal end of the operation lever 26 supported on a pivot 27. The yoke 31 has pawls 32 in engagement with the connection 12 of the clutch element 4. The operation lever 26 and yoke 31 are provided at the opposite sides thereof with projections 26a and 31a for supporting the pulling springs 29 therebetween. Thus the pair of springs 29 acts to rotate the yoke 31 in opposite directions about the pivot 30 and determines the position of the yoke 31 relative to the operation lever 26 where the opposing two active forces come into balance.

As will be apparent from reference to FIG. 1, the spring 16 acts on the operation lever 26, urging the clutch element 4 toward the brake member 3. Therefore, if the operation lever 26 is operated to move the clutch element 4 toward the drive member against the action of the spring 16, the yoke 31 follows the operation lever 26 under the action of the pair of pulling springs 29, bringing the clutch element 4 into contact with the flywheel 2. Conversely, if the operation lever 26 is relieved of the operating force, the pulling spring 16 returns the lever 26 automatically to the original position, causing the yoke 31 to move the clutch element 4 backward into contact with the brake member 3, whereby the clutch element is stopped.

The moment when the clutch element 4 comes into contact with flywheel 2 or brake member 3 for the engagement or disengagement of the clutch, the pulling springs 29 act elastically to absorb impact and vibration to assure smooth contact.

Figure 7:
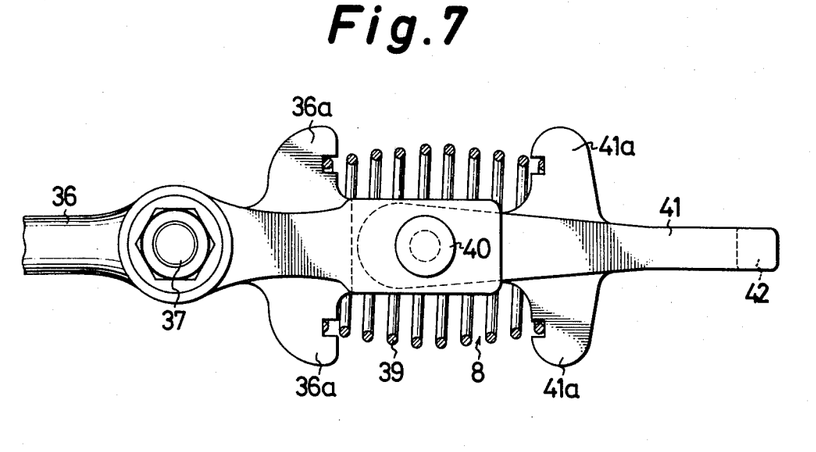
FIG. 7 is a plan view on an enlarged scale showing the principal part of another embodiment.
Figure 8:
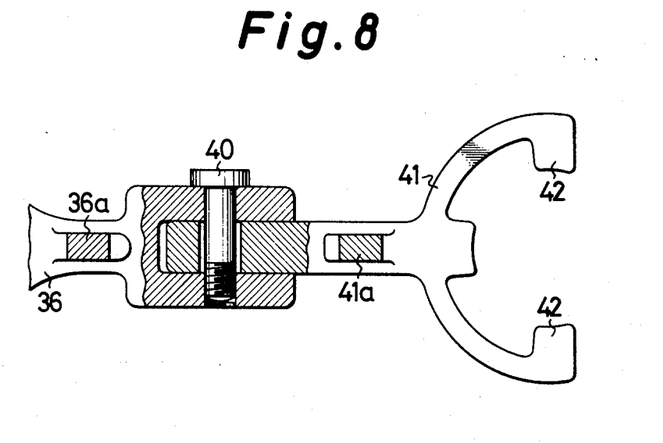
FIG. 8 is a side elevation of the same.

The spring member 8 for absorbing impact and vibration may alternatively comprise a compression spring 39 as illustrated in FIGS. 7 and 8.

According to this embodiment, the base portion of a yoke 41 is supported by a pivot 40 on the distal end of an operation lever 36 supported on a pivot 37. The operation lever 36 and the yoke 41 are formed on its opposite sides with projections 36a and 41a to provide compression spring 39 therebetween, the spring 39 acting on the projection. As already described, pawls 42 of the yoke 41 engage in the connecting portion 12 for the clutch element 4 to associate the yoke with the clutch element.

Thus the coiled spring 39 elastically acting between the projections 36a and 41a determines the position of the yoke 41 with respect to the operation lever 36 where the acting forces between the projections on the opposite sides come into balance. As in the case of FIG. 1, the pulling spring 16 acting on the operation lever 36 breaks the balance to shift the clutch element 4 toward the brake member. By way of the yoke 41, the clutch element 4 follows the clutch engaging and disengaging operation of the lever 36 to effect or interrupt the transmission of torque. The coiled spring 39 elastically absorbs and mitigates the impact and vibration resulting from the engaging and disengaging operation.

Figure 9:
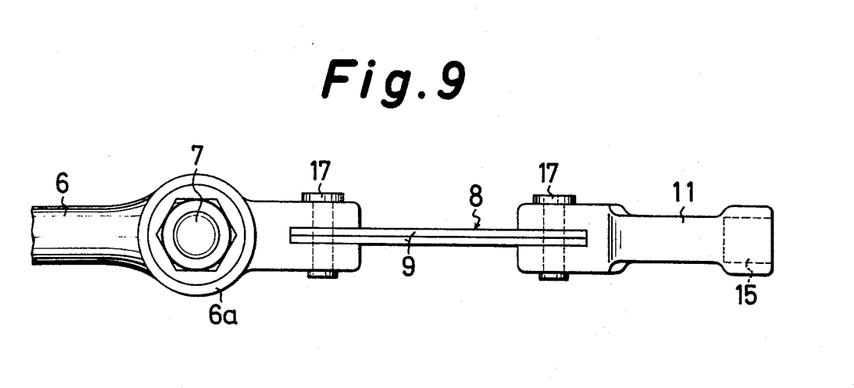
FIG. 9 is an enlarged plan view showing the principal part of another embodiment.
Figure 10:
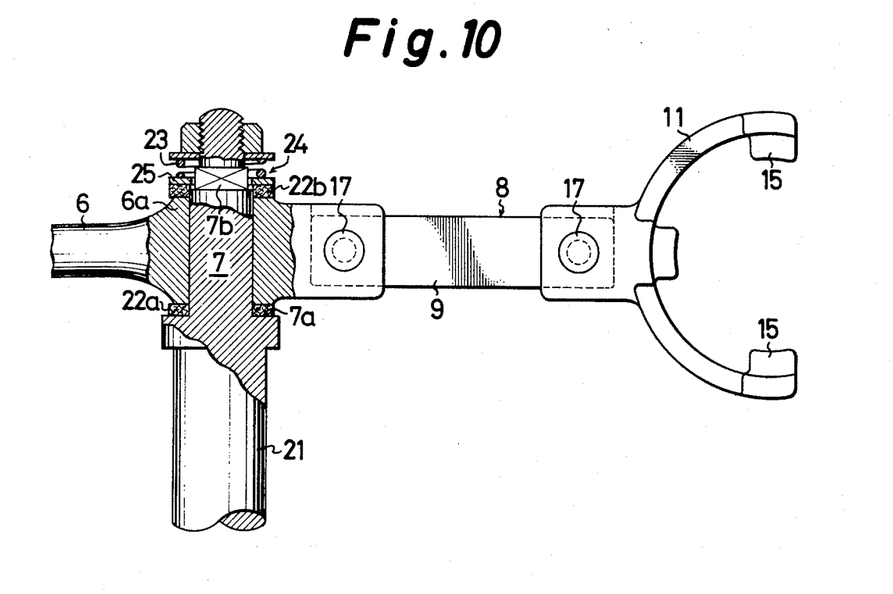
FIG. 10 is a side elevation of the same.

Friction damper means 24 for giving frictional resistance to the clutch engaging and disengaging movement is provided on the pin 7 for supporting the operation lever 6, for example, as shown in FIGS. 9 and 10.

The boss portion 6a of the operation lever 6 is provided, on its opposite end faces, with friction members 22a and 22b, which are in pressing contact with these faces under the action of a coiled spring 23. The other face of the friction member 22a is in ultimate contact with a stepped end face 7a of the pin 7. The friction member 22b is pressed against the boss portion by the spring 23 with a washer 25 which is interposed between the spring and the member 22b and which fits around an angular portion 7b of the pin 7 against rotation.

Figure 3:
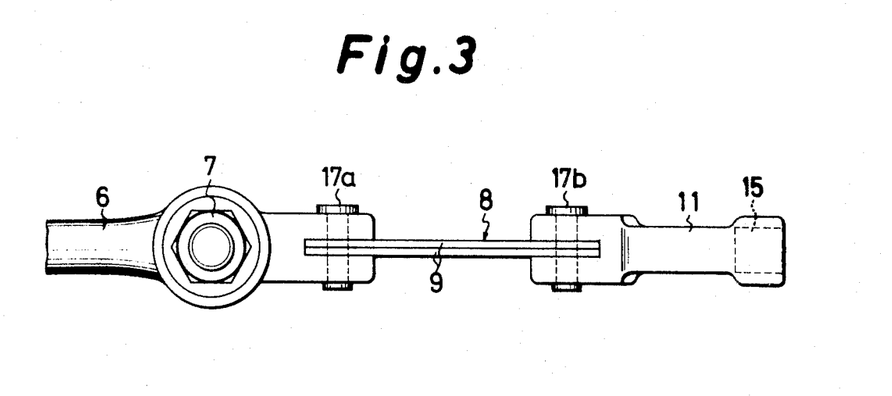
FIG. 3 is a plan view on an enlarged scale showing the principal part.
Figure 4:
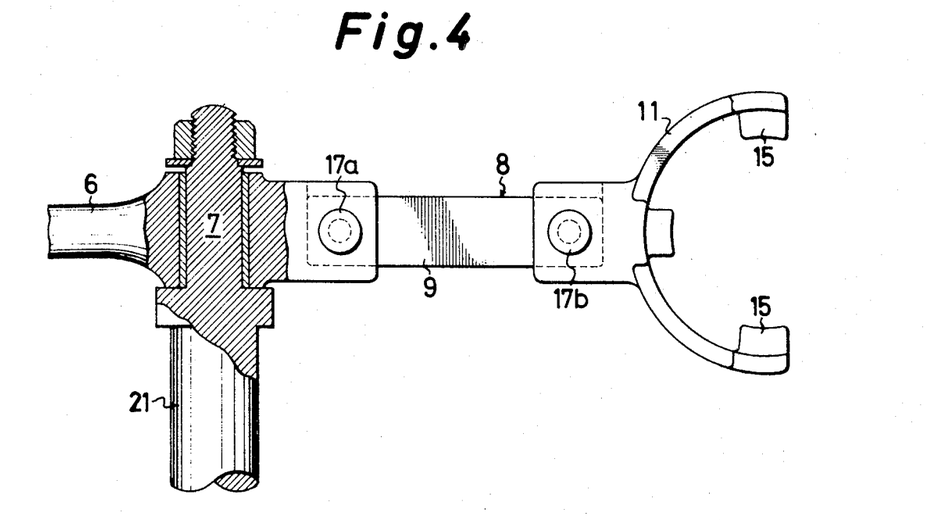
FIG. 4 is a side elevation of the same.

Accordingly, the friction damper means 24 produces frictional resistance which prevents abrupt pivotal movement of the operation lever 6, eliminating impactive contact of the clutch element 4 with the drive member and the brake member during the clutch engaging and disengaging movement to assure improved ability to absorb impact and vibration. In the drawings, the same members as those of FIGS. 3 and 4 are referred to by the same reference numberals.

Figure 11:
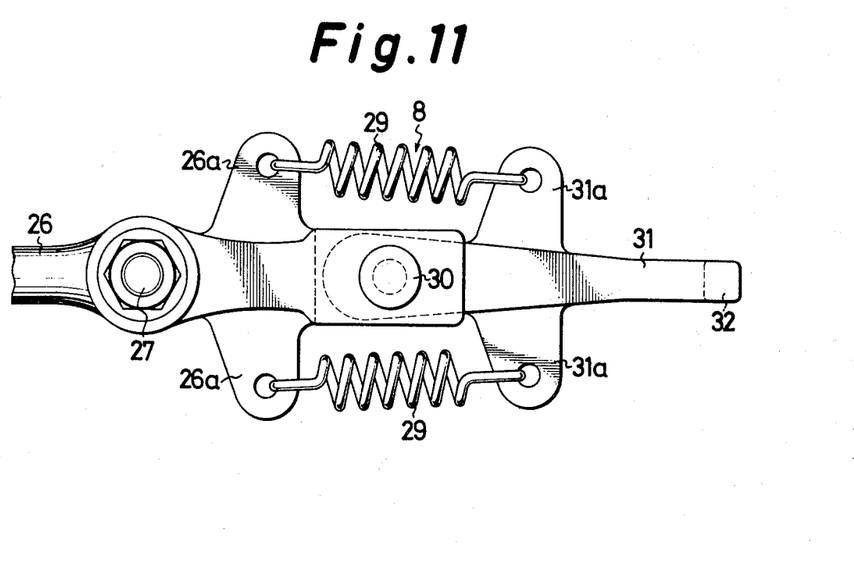
FIG. 11 is an enlarged plan view showing the principal part of another embodiment.
Figure 12:
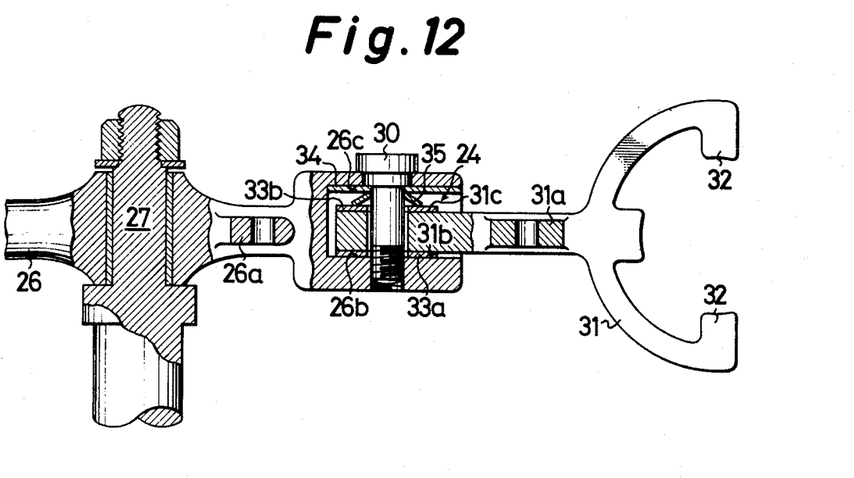
FIG. 12 is a side elevation of the same.

FIGS. 11 and 12 show the embodiment of FIGS. 5 and 6 incorporating the friction damper means 24. In this case, the connecting portion including the pivot 30 supporting the operation lever 26 and the yoke 31 has a friction member 33a between the faces 26b and 31b of these members, another frictional member 33b on the other face 31c of the yoke 31, another friction member 34 beneath the other face 26c of the operation lever 26, and a dished spring 35 interposed between the friction members 33b and 34. The friction members 33a, 33b and 34 are in pressing contact with the faces 26b, 31b, 31c and 26c to give frictional resistance to the pivotal movement of the operation lever and to thereby prevent impactive contact of the clutch element 4 with the drive member and the brake member for the absorbtion of impact and vibration.

Figure 13:
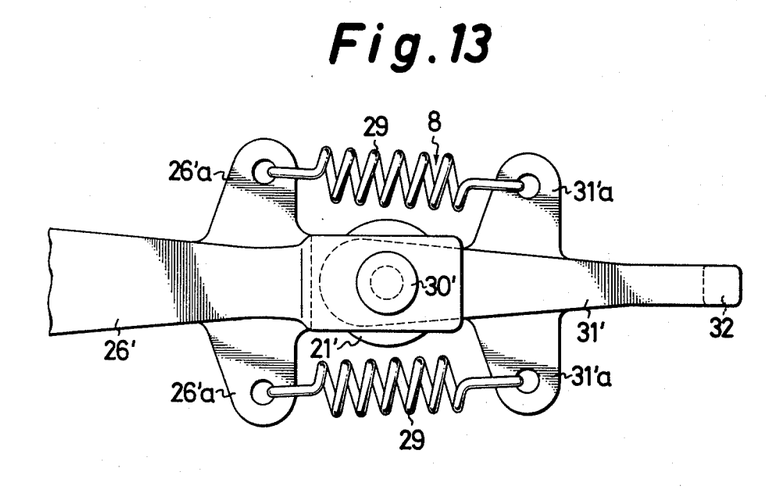
FIG. 13 is an enlarged plan view showing the principal part of another embodiment.
Figure 14:
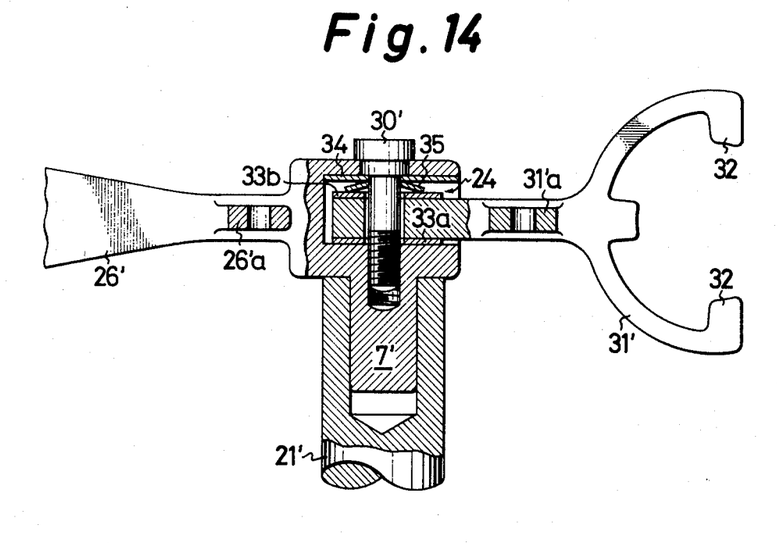
FIG. 14 is a side elevation of the same.

FIGS. 13 and 14 show an embodiment in which a pivot 30' for connecting an operation lever 26' to a yoke 31' is disposed coaxially with a pin 7' serving as the center of rotation of the operation lever 26' and in which the aforementioned connecting portion includes the friction damper means comprising the friction members 33a, 33b, 34 and dished spring 35.

To describe in detail, the pin 7' extending from the operation lever 26' is rotatably fitted in a hole at the upper end of a support member 21', with the connecting pivot 30' positioned on its axis. The pulling springs 29 serving as the spring member 8 are provided between projections 26'a and 31'a on the opposite sides of the operation lever 26' and yoke 31' respectively. By virtue of this construction, the friction damper means 24 acts to absorb impact and vibration.

Figure 15:
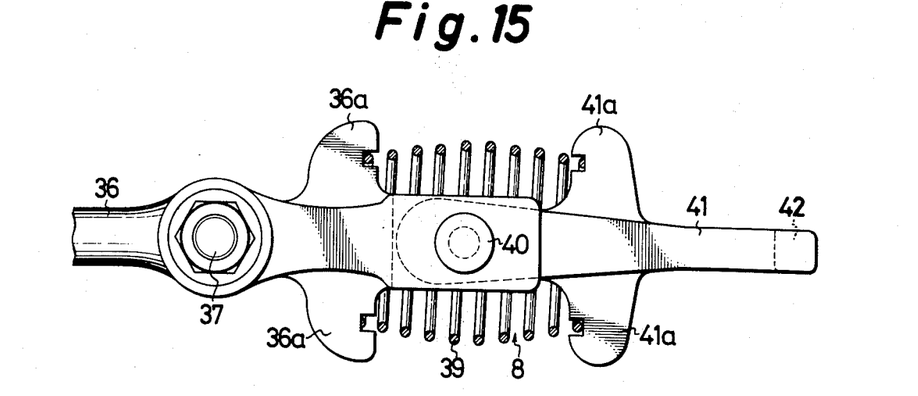
FIG. 15 is an enlarged plan view of another embodiment.
Figure 16:
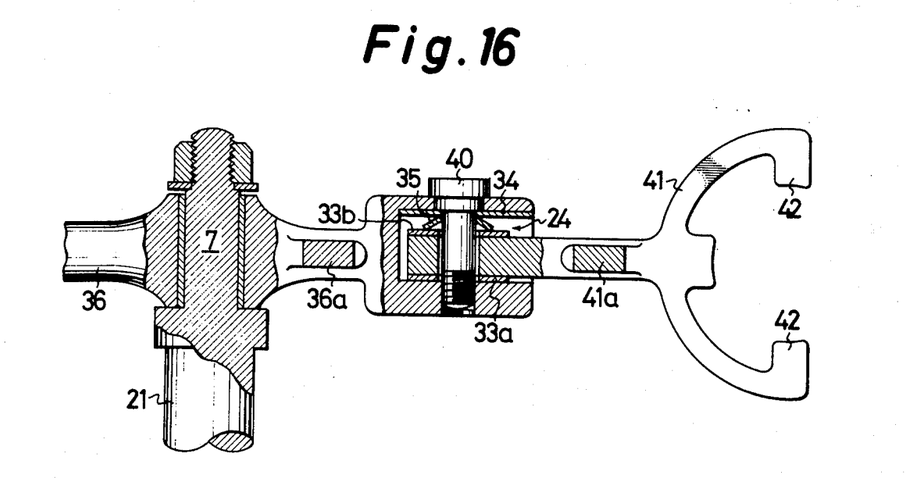
FIG. 16 is a side elevation of the same.

FIGS. 15 and 16 show an embodiment comprising the embodiment of FIGS. 7 and 8 incorporating the friction damper means. The same parts as those already described are designated by the same reference numerals.

By adjusting the strength of the spring member 8 and/or the strength of spring of the friction damper means 24, the abilities of the foregoing embodiments to absorb impact and vibration can be readily adapted for clutch assemblies to be subjected to varying loads.

Although the foregoing embodiments are given with respect to clutch assembly of a specific type, this invention is of cource readily applicable to apparatuses of various types.

What is claimed is:

1. A clutch assembly comprising:
   A. a power transmitting member formed with a friction surface on one side thereof and rotated by a drive shaft;
   B. a stationary brake member having a friction surface spaced apart from said friction surface of said power transmitting member and in facing relation thereto;
   C. a clutch element interposed between both said friction surfaces and having friction surfaces adapted to be moved selectively into contact with said friction surfaces, said clutch element being supported on a driven shaft so as to be movable only in the axial direction thereof;
   D. an operation lever for moving said clutch element in said axial direction;
   E. connecting means for flexibly connecting said operation lever to said clutch element and for mitigating impactive engagement and disengagement of said clutch element, comprising a spring member which provides flexibility in said axial direction;
   F. biasing means for urging said clutch element toward said brake member at all times; and
   G. friction damper means for giving friction resistance to the engaging and disengaging movement of said clutch element, said friction damper means being so disposed as to exert a frictional force between said operation lever and a yoke pivoted to an end of said lever, and said lever and yoke having overlapping end portions connected by pivot means and spring means urging at least one pair of friction surfaces on said end portions into frictional engagement.

* * * * *